May 4, 1965  R. A. HALBERG  3,181,416
AUTO-FOCUS VIEWING AND REPRODUCING APPARATUS
Filed April 27, 1961  7 Sheets-Sheet 1

INVENTOR.
ROBERT A. HALBERG
BY
Carpenter, Abbott, Coulter & Kinney
ATTORNEYS

INVENTOR.
ROBERT A. HALBERG
BY
Carpenter, Abbott, Coulter & Kinney
ATTORNEYS

May 4, 1965 R. A. HALBERG 3,181,416
AUTO-FOCUS VIEWING AND REPRODUCING APPARATUS
Filed April 27, 1961 7 Sheets-Sheet 3

INVENTOR.
ROBERT A. HALBERG
BY
ATTORNEYS

May 4, 1965

R. A. HALBERG 3,181,416

AUTO-FOCUS VIEWING AND REPRODUCING APPARATUS

Filed April 27, 1961

INVENTOR.
ROBERT A. HALBERG

BY Carpenter, Abbott, Coulter & Kinney

ATTORNEYS

May 4, 1965  R. A. HALBERG  3,181,416
AUTO-FOCUS VIEWING AND REPRODUCING APPARATUS
Filed April 27, 1961  7 Sheets-Sheet 7

INVENTOR.
ROBERT A. HALBERG
BY
Carpenter, Abbott, Coulter & Kinney
ATTORNEYS

United States Patent Office 3,181,416
Patented May 4, 1965

3,181,416
AUTO-FOCUS VIEWING AND REPRODUCING
APPARATUS
Robert A. Halberg, West St. Paul, Minn., assignor to Minnesota Mining and Manufacturing Company, St. Paul, Minn., a corporation of Delaware
Filed Apr. 27, 1961, Ser. No. 106,039
4 Claims. (Cl. 88—24)

This invention relates to a daylight enlarger apparatus for providing prints of photographic transparencies. In one aspect the invention relates to an enlarger apparatus for rapidly and inexpensively preparing prints of varying sizes. In still another aspect this invention relates to an integrated device for utilizing the electroconductive or electrolytic process in preparing prints of varying sizes from a given transparency.

For many years the darkroom enlarger has been conventional equipment in both the commercial and home photographic laboratory. Such equipment generally has been capable of printing in varying degrees of magnification by simply varying the distance of the print paper from the lens system and by manually adjusting the focus. Although such enlargers, even with automatic focus provision, have been suitable for use in the ordinary photographic processes, they are relatively cumbersome and require several adjustments, usually in a darkroom. Moreover, they suffer all the disadvantages of the ordinary photographic processes and must be used in conjunction with ordinary darkroom equipment, with considerable expenditure of time in the various steps involved. For example, for layout work in magazines, periodicals and the like it is frequently desirable to make a number of prints of varying size from one transparency, which prints permit alternative visual layouts of the pages to the best esthetic advantage and with the most economical use of space. Printing by ordinary photographic means requires expensive and time-consuming operations to obtain the necessary number of prints for such layout work and is accompanied by considerable waste of materials and labor.

It is therefore an object of this invention to provide an integrated apparatus for the rapid reproduction of images in varying degrees of enlargement.

It is also an object of this invention to provide an apparatus for daylight enlargement, viewing and printing of transparencies and for the masking and cropping of the prints produced thereby.

It is still another object of this invention to provide a metering device to minimize waste of film or sensitized paper.

Yet another object of this invention is to provide a daylight enlarger having a multiple projection lens system which can be used interchangeably with appropriate condensing systems.

For purposes of convenience and clarity, the description of the daylight enlarging apparatus of this invention will refer to the embodiment illustrated in the figures.

Figure 1:
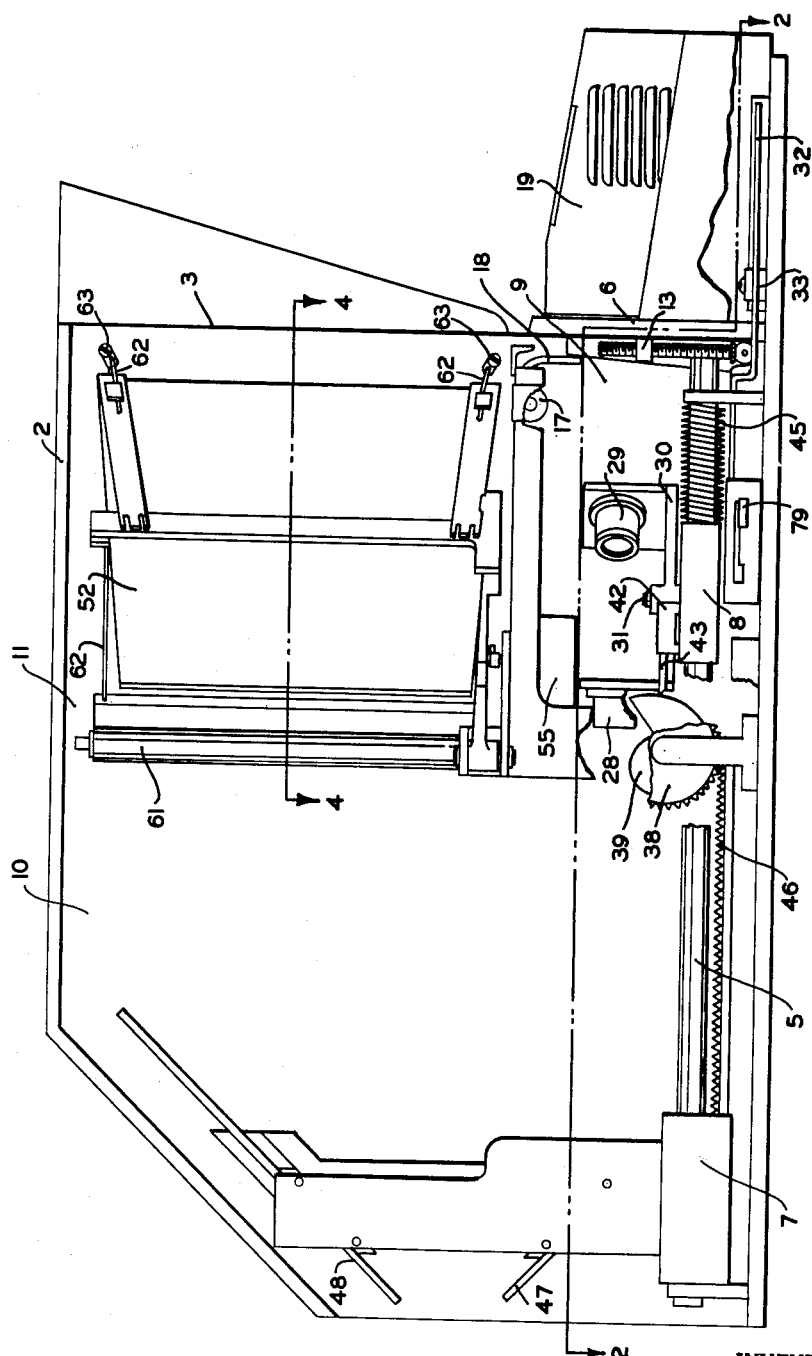
FIGURE 1 is a vertical cross section of the daylight enlarger and printer apparatus, with the light source cabinet in operating position.

The enclosed housing 2 has a viewing screen 3, is attached to a base 4, and contains therein two parallel rails forming a track 5 affixed to said base, an adjustable film holder 6 adjacent one end of and normal to said track, a reflecting mirror sled 7 slidably mounted on said track, and a projection lens sled 8 also mounted on said track. Generally, the interior of the enclosed housing can be described in terms of the projection area 9, the optical path reversal area 10, the exposure and viewing area 11, and the developing area 51.

Figure 5:
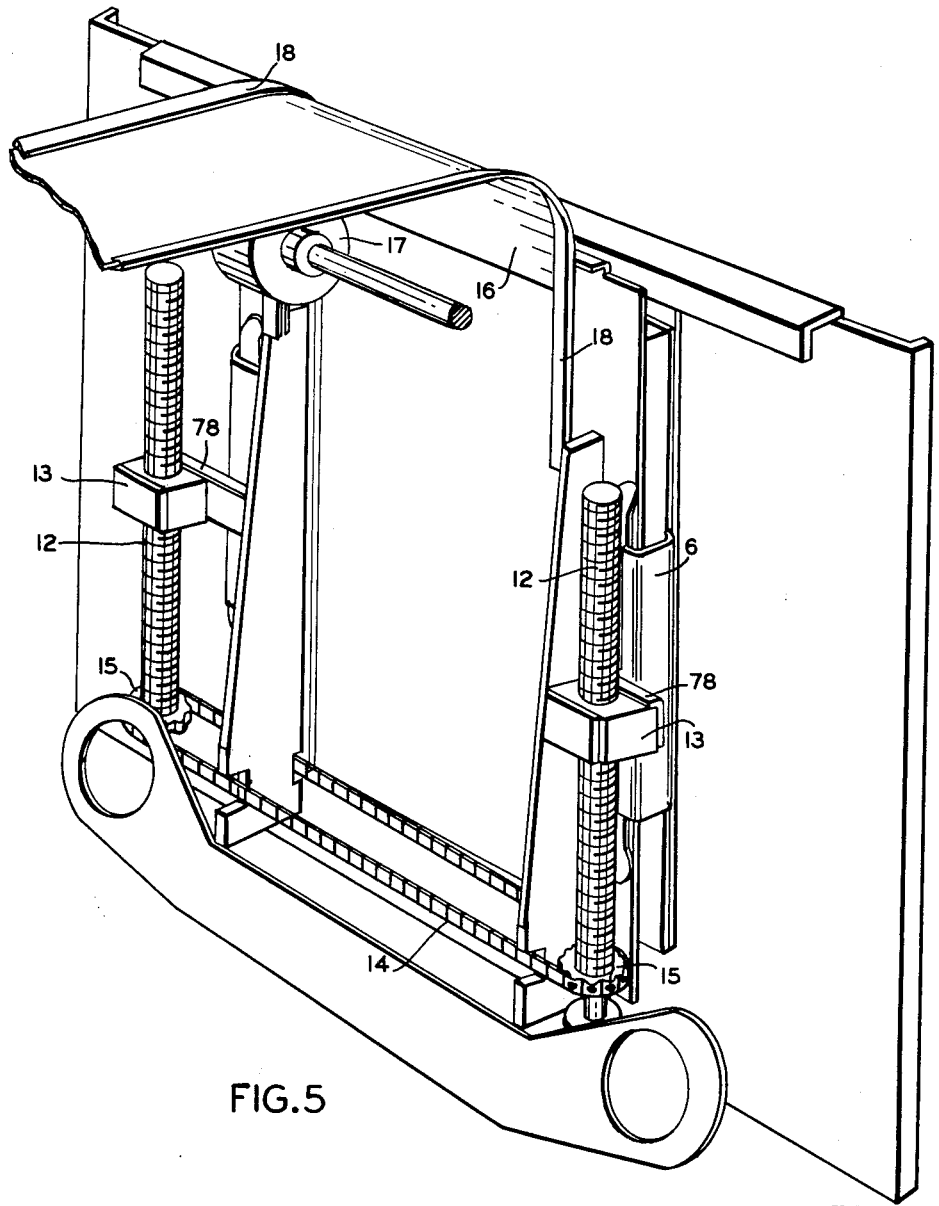
FIGURE 5 is an oblique view of the adjustable film holder and mask.

The projection area is located on base 4 at the front or viewing end of housing 2. The film holder for the transparency to be enlarged, as in FIGURE 5, is adjustable both in a vertical and in a horizontal direction. Horizontal adjustment is provided by appropriate lateral movement of the film holder 6. Vertical adjustment is provided by simultaneous rotation of lead screws 12 carrying nuts 13 on which a lateral projection 78 of film holder 6 rests. An external knob, not shown, connects to one of the threaded shafts through a flexible cable and provides for rotation thereof. Simultaneous rotation of both lead screws 12 is effected by chain 14 and sprockets 15. An adjustable mask 16 driven by frictional engagement with rubber roller 17 rides in guide rails 18 and permits cropping or masking of the projected image both for viewing on screen and for projection onto the film or sensitized paper.

Figure 6:
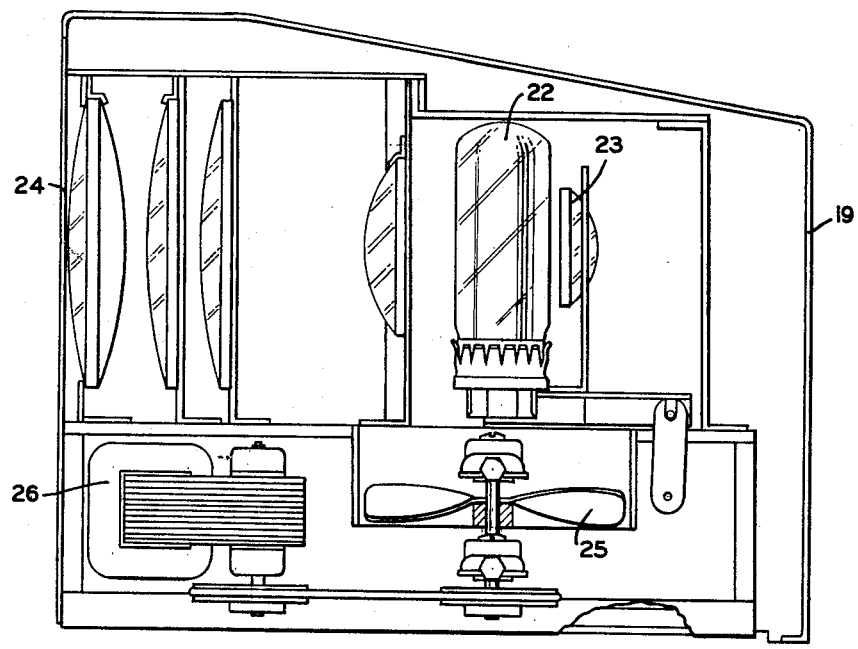
FIGURE 6 is a vertical cross section of the removable light source.
Figure 7:
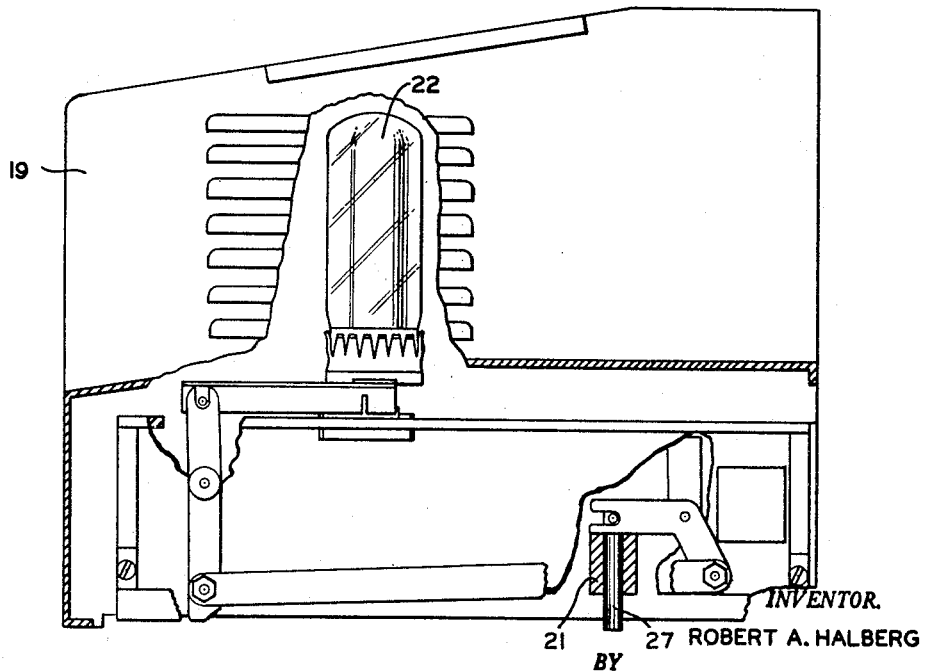
FIGURE 7 is a side view of the removable light source, partly broken away to show the linkage means for adjusting the position of the bulb.

A separately enclosed and removable external light source and condensing system 19, hereafter referred to as "light source," is located outside the enclosed housing and is positioned on base 4 by means of guides 20. As shown in FIGURES 6 and 7, the external light source and condensing system is enclosed in housing 19 and contains a bulb 22, reflector 23 and suitable condensing lenses which project light through window 24 and hence through the transparency held in film holder 6. Cooling is provided by fan 25 driven by motor 26 through a belt drive. A significant feature of the light source and condensing system is the adjustable light source, which permits efficient use of the light with more than one projection lens, as will later be described. Bulb 22 and reflector 23 are connected by mechanical linkages to pin 27 in sleeve 21, shown in FIGURE 7 in its downward or extended position. By manual movement of the linkage, pin 27 can be moved into an upward position, recessed into the housing 19, thereby moving bulb 22 and reflector 23 closer to the condensing lens system and providing a more efficient light source for an alternate and complementary projection lens.

Figure 3:
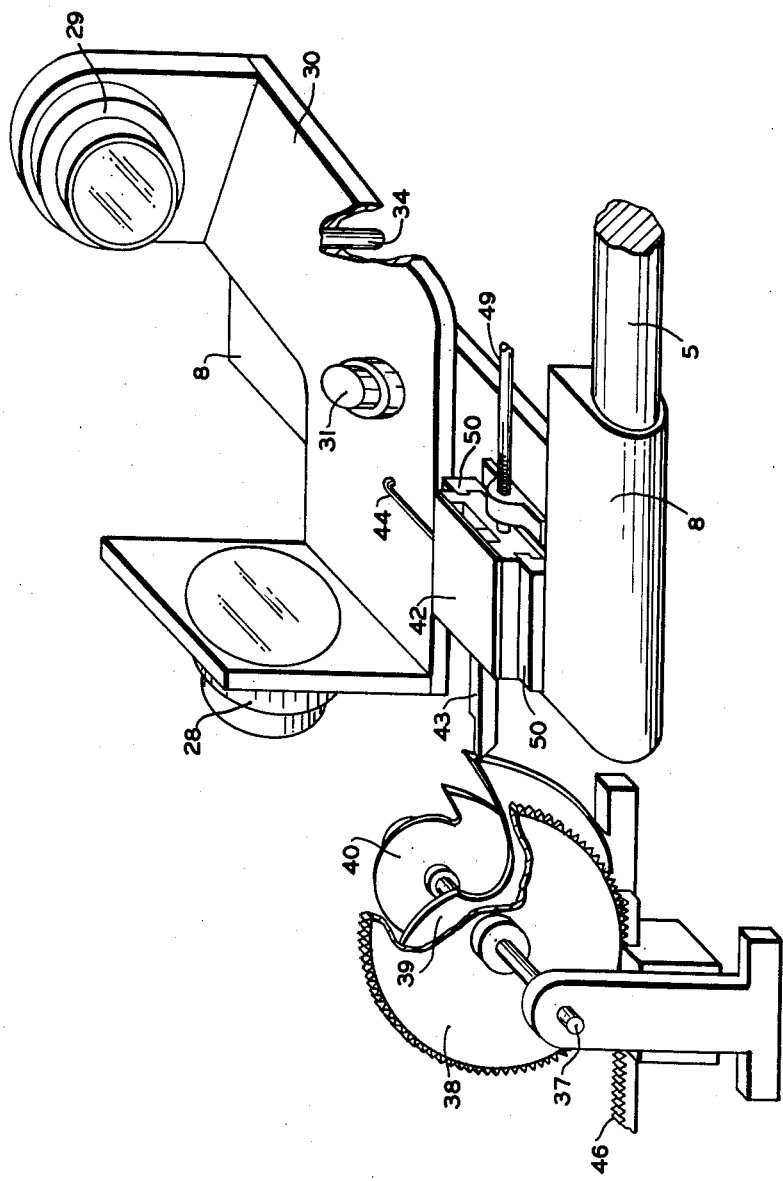
FIGURE 3 is an oblique view of the projection lens sled, focusing cams and adjustable cam follower.

In projection area 9 two projection lenses 28 and 29 are mounted on swing turret 30. Turret 30 is pivotally connected to projection lens sled 8 by pin 31, as shown in FIGURE 3, permitting either of the projection lenses to be moved into operating position. In the drawings lens 28 is shown in operating position. Activating arm 32 is pivoted about axis 33 and extends outside housing 2 between guides 20, terminating in a fork for engagement with pin 27 of the light source housing 19 when said pin is in its downward or extended position (as shown in FIGURE 7). The other extremity of activating arm 32 is also forked and encompasses a pin 34 extending downward from turret 30. When the light source 19 is positioned on guides 20 adjacent the film holder, with the pin 27 in its upward or recessed position, activating arm 32 is maintained by spring 35 in contact with stop 36, thereby positioning projection lens 28 in operating position, as shown in the drawings. When pin 27 is in its downward or extended position, as light source 21 is moved into operating position on guides 20, pin 27 is engaged by the forked end of activating arm 32 and swings turret 30 and hence projection lens 29 into operating position. This arrangement also simultaneously positions the lamp in its proper position, thereby providing the optimum light source for each of the respective projection lenses.

Rotatable shaft 37, driven by electric motor 41, contains a drive gear 38 and cams 39 and 50, and is positioned on the reflecting mirror sled side of projection lens sled 8. A fine focus block 42 on lens sled 8 includes a cam follower 43 in a horizontal slot therein, said follower being capable of lateral movement only and being so moved by connection to lens turret 30 through connecting rod 44. This face of the cam follower is thus automatically positioned so as to alternatively coincide with either cam 39 or cam 40, depending on the particular projection lens in the operating position. Projection lens sled is biased by spring 45 in the direction of the cams, one of which the cam follower contacts. Drive gear 38 rotates simultaneously with said cams and drives rack 46, which is affixed to reflecting mirror sled 7. Reflecting mirror sled 7 carries two mirrors, 47 and 48, each of which are positioned at a 45° angle with the vertical plane, thereby reversing the direction of the projected images and provides a focused image on viewing screen 3. The shape of cams 39 and 40 are selected so as to continuously maintain the operating projection lens in its proper focal position as the reflecting sled 7 is positioned on rails 5 for a shorter or longer projection path, and hence a smaller or larger projected image on the viewing screen 3. Limit switches 100 and 101 limit the travel of reflecting sled 7 by shutting off power to motor 41. Fine focus adjustment is achieved by movement of shaft 49 to slide the fine focus block 42 and cam follower therein further forward or backward relative to the projection lens sled. The fine focus block 42 slides on a guide 50 which is permanently affixed to the lens sled. Shaft 49 is connected to an external control by a flexible cable, not shown. Lens sled 8 also contains pin 80, which is engaged by interlock lever 79. Interlock lever 79 also contains latch 81 for locking the light source in its operating or in its "neutral" position.

Figure 4:
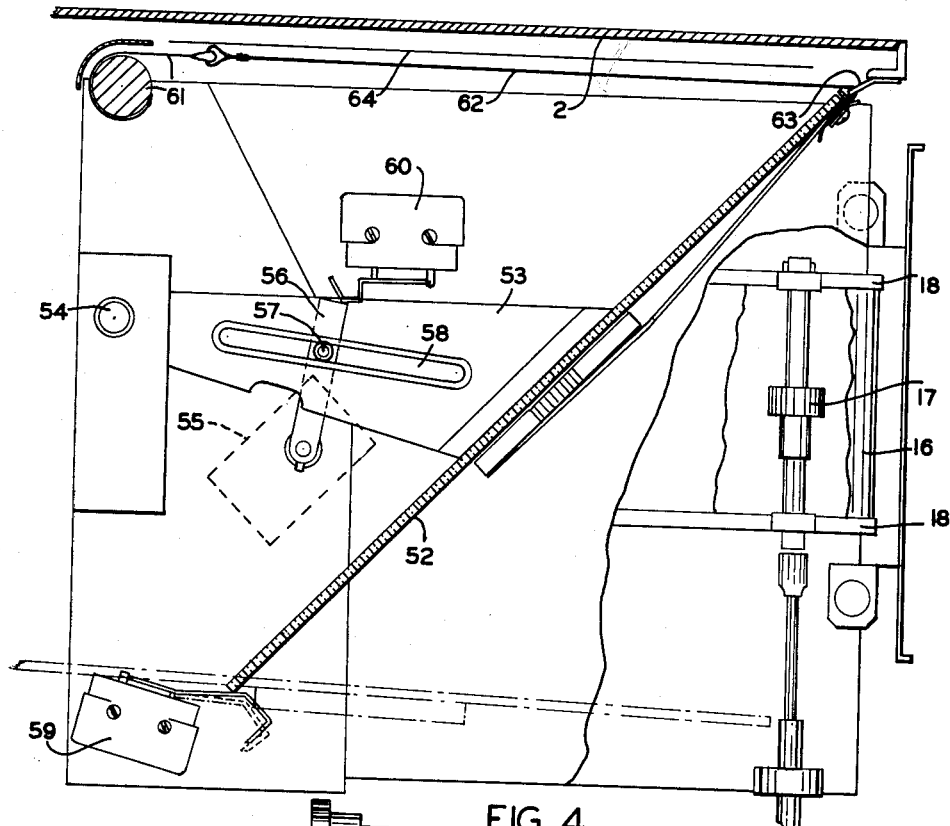
FIGURE 4 is a horizontal cross section of the exposing and viewing area, taken along line 4—4 of FIGURE 1.

The exposure and viewing area 11, shown in horizontal cross-section in FIGURE 4, contains a swinging mirror 52 attached to slotted mirror arm 53, which arm is pivoted about pin 54. Electric motor 55, located under the floor of the exposure and viewing area 11, drives arm 56 and roller 57 attached thereto in a circular path. Roller 57 extends into slot 58 in mirror arm 53 and drives slotted mirror arm 53. Each full rotation or cycle of arm 56 moves mirror 52 from its folded or non-reflecting position, as shown in broken lines in FIGURE 4, to its operating or reflecting position, as shown in solid lines in FIGURE 4, and back to its non-reflecting position again. Switches 59 and 60 are alternately operated by movement of the mirror 52 during each half cycle rotation of arm 56. A rolled shutter or blind 61 is connected to both the top and bottom corners of mirror 52 by cables 62 through eyehooks or pulleys 63 affixed to housing 2. Only the top cable is visible in FIGURE 4. These cables are affixed to the mirror corners, as shown in the side elevation, FIGURE 1. The film or light sensitive paper 64 is fed downward from a supply roll, not shown, between curtain 61 and the wall of housing 2 and into the developing area 51, described later.

The front or viewing screen portion of the exposure and viewing area is broken away in FIGURE 4 to show the adjustable mask, described earlier, in the projection area 9.

Figures 8, 9:
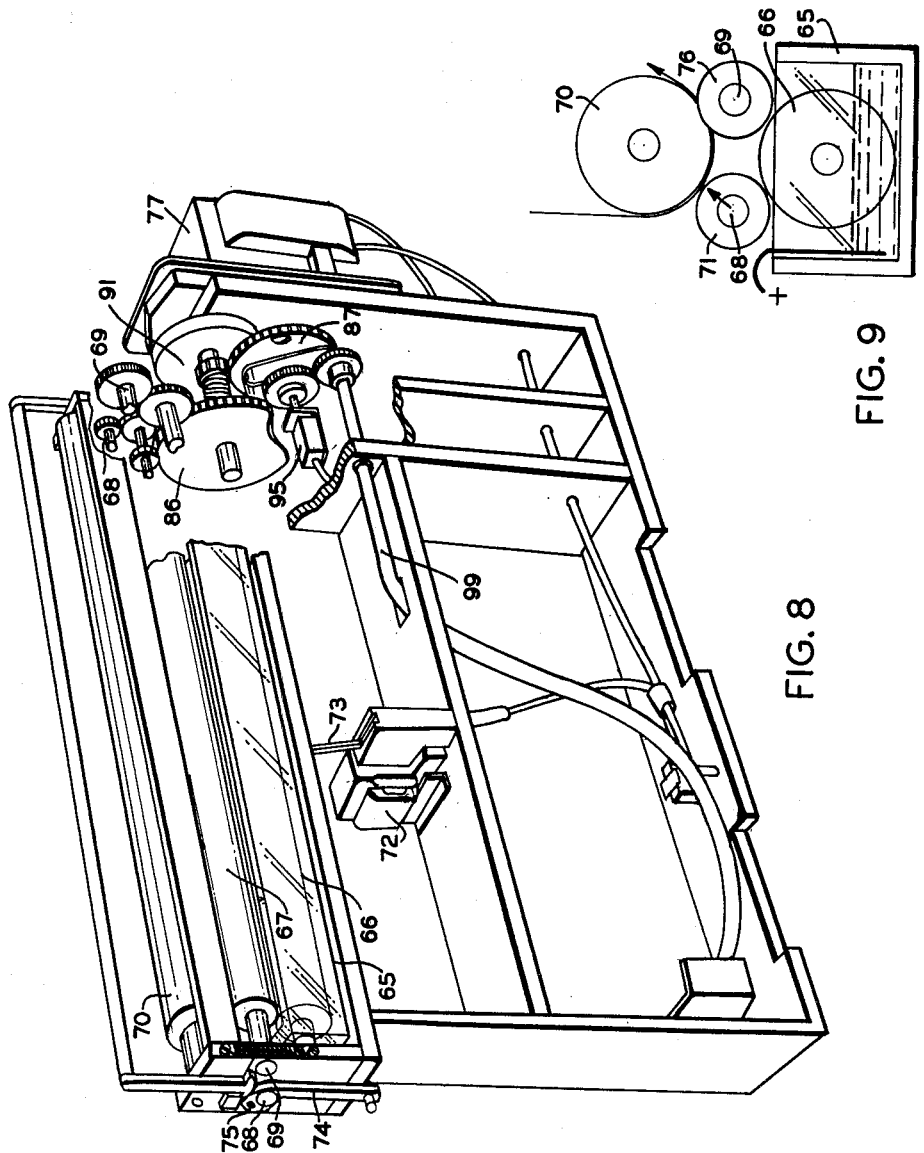
FIGURE 8 is an oblique view of the developing section and film measuring device.
FIGURE 9 is a schematic cross sectional view of the developer rolls and developer bath showing the film bath.

Under the film side of the housing containing the photosensitive paper 64 and along the side of the housing containing the photosensitive paper 64 is the development section 51, as shown in FIGURE 8. A rotatable foamed plastic developer roller 66 is immersed in developer solution contained in bath 65. A porous, absorptive plastic foam, wetting roll 71 on driven shaft 68 rides on porous, foamed plastic developer roll 66 and is adjustably positioned on the periphery thereof, as shown in FIGURE 9. Solenoid 72 operates lever 73, which is connected through appropriate mechanical linkage to one end of arm 74, the other end of which is pivotally attached to the frame at 75. Shaft 68 of wetting roll 71 is journalled in arm 74 such that activation of solenoid 72 brings wetting roll 71 into contact with exposed sensitized paper which is in contact with upper wringer roll 70 during the developing cycle. Lower wringer roll 76 on driven shaft 69 maintains pressural contact with upper wringer roll 70, and is driven by motor 77 through appropriate drive gears, as shown in FIGURE 8. Motor 77 similarly provides power for rotation of wetting roll 71. An electrode, not shown, is immersed in the developer solution in bath 65 and is connected as the cathode to a variable source of direct current.

The photosensitive copypaper used in the apparatus of this invention comprises a strongly photoconductive layer of a photoconductor, such as zinc oxide, indium oxide, etc., intimately dispersed in a suitable binder, such as a copolymer of butadiene and styrene ("Pliolite S-7"), this photoconductive layer being coated on and in intimate electrical contact with an electrically conductive backing, such as aluminum foil or aluminum coated plastic. Such photoconductive copysheets for use in the electrolytic process for image reproduction are described in greater detail in U.S. patent application S.N. 692,529, filed October 28, 1957, now U.S. Patent No 3,010,884. The copypaper from a feed or supply roll, not shown, is fed past the blind 61, as mentioned earlier, and is led downward into the development section, where it is contacted with porous, electrolyte-containing roll 71 as it passes around upper wringer roll 70 and then is drawn between the upper wringer roll 70 and the lower driven wringer roll 76. This latter operation is more clearly illustrated in FIGURE 9. The electrically conductive layer of the copypaper roll is connected as the anode to the same variable source of direct current mentioned earlier in conjunction with the developer bath 65, the electrical connection being made at the metal supply or feed roll for the copypaper.

Figure 2:
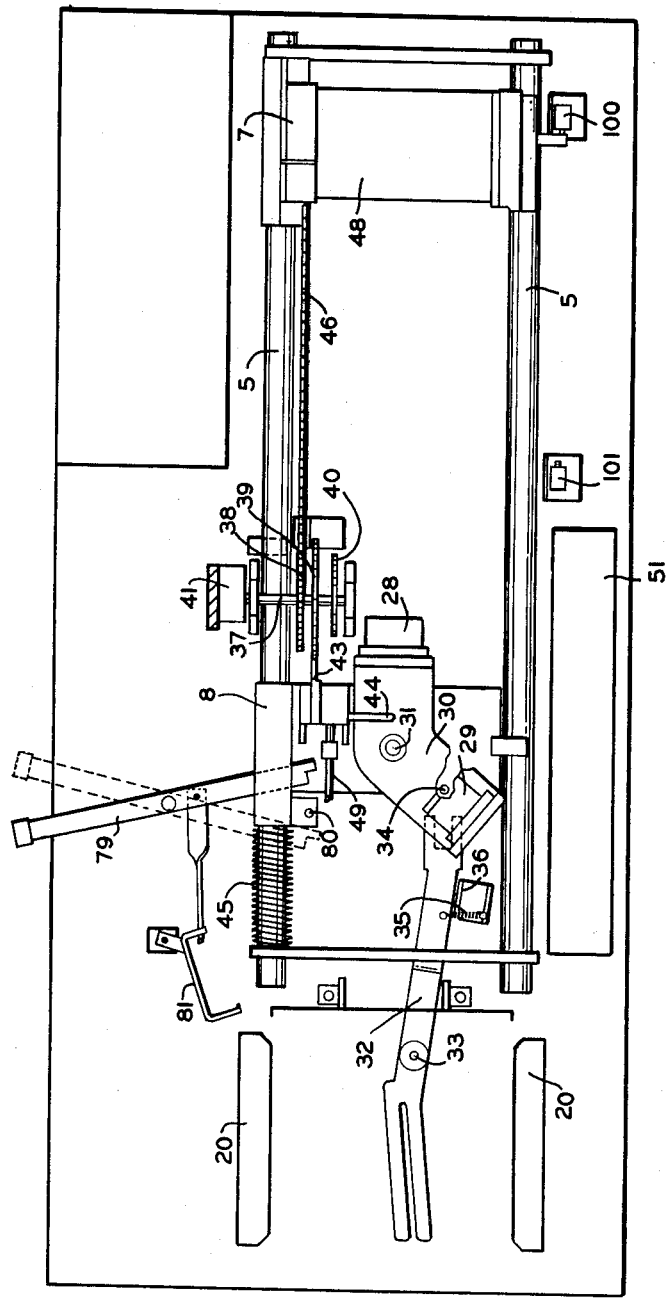
FIGURE 2 is a horizontal cross section of the daylight enlarger and printer apparatus taken along line 2—2 of FIGURE 1, the light source cabinet being removed.

In operation, a negative or positive transparency is placed in the film holder 6 and is positioned laterally by manual manipulation of the film holder and vertically by means of the vertical adjustment, described earlier. The light source 19 is adjusted for the particular projection lens to be utilized by the extension or retraction of pin 27. As the light source is moved into position on rails or guides 20, pin 27, if extended, is engaged by the forked end of activating arm 32 and swings alternate projection lens 29 into operating position. With pin 27 in its recessed position, spring 35 retains activating arm 32 against stop 36 and hence projection lens 28 is maintained in operating position. The light source lamp is, as mentioned earlier, automatically adjusted by the position of pin 27. Before insertion or removal of the light source, interlock lever must be moved to its "neutral" position, shown in dotted lines on FIGURE 2, thereby retracting lens sled 8 and depressing spring 45, disengaging cam follower 43 from the cam, and unlocking latch 81. Retraction of lens sled 8 in this manner permits unrestricted lateral movement of cam follower 43 for alignment with the particular cam corresponding to the projection lens to be used. Unless interlock lever is in "neutral" position, latch 81 prevents both removal from and insertion into operating position of removable light source 19, thus preventing damage to the cams and cam follower.

With the light source in operating position, and the interlock lever 79 in "closed" position, motor 41 can be activated through external controls to rotate shaft 37 in either direction. Drive gear 38 thus adjusts or positions reflecting mirror sled 7 and varies the degree of enlargement of the image on the viewing screen 3. Simultaneous with and in synchronization with the positioning of the reflecting sled the contact between the cam follower and the selected cam maintains sharp focus of the image. External fine focus adjustment may be affected by movement of shaft 49 and the resultant repositioning of the cam follower with respect to the projection lens sled. Rubber roll 17 can be operated through external linkage to mask the unused or undesired portion of the viewing screen with sliding mask 16.

When a print is desired of the image appearing on the viewing screen and of a size corresponding to such image, an exposing and developing sequence is activated by means of an externally located control. Electrical means may be used to automatically control the exposing and developing sequence, although the various steps can be handled individually by external use of appropriate manual and electrical controls. With the light off, motor 55 is actuated and arm 56 rotates approximately 180° or until mirror arm 53 contracts switch 60, shutting off power to motor 55. This brings reflecting mirror from its folded non-reflecting position to its reflecting or operating position and simultaneously opens blind 61, permitting exposure of photosensitive paper 64. After the desired light exposure, the light is turned off and motor 55 is once against activated, returning reflecting mirror 52 to its non-reflecting or folded position, where the motor 55 is denergized by contact of the mirror with switch 59. The blind is simultaneously extended once again to shield the photosensitive paper from further exposure to light during subsequent viewing.

In the development sequence, lower wringer roll 76, obtaining power from motor 77, rotates and feeds a measured length of the photosensitive paper through the development section. Thus, as the light exposed paper travels around freely rotating (or driven) upper wringer roll 70 it contacts rotating porous developer roll 71, which is brought into contact with roll 70 by activation of solenoid 72 and through the associated linkages, described earlier. After development, deactivation of solenoid 72 removes developer roll 71 from contact with the photosensitive paper. Electrical D.C. power is provided for the electrolytic development, the electrically conductive backing of the photoconductive paper being connected as anode and a suitable electrode immersed in the developer solution in bath 65 serving as cathode. Since the photoconductivity of the light sensitive copysheet surface varies directly in proportion to light exposure, a conductivity pattern corresponding to the projected light image is impressed on the copysheet as a "latent image." As the exposed paper contacts developer roll 71 electrolysis takes place, and a visible image is produced. This may be accomplished with a variety of ionizable developer solutions, which solutions provide an electrical current path through both developer rolls 66 and 68 and which solutions contain a material which changes its color value upon reduction at the light struck portions of the photoconductive surface, thereby forming colored deposits on the copysheet and effectively developing the "latent image." Such developers include silver salts, nickel salts, iron salts, leuco and other dyes, etc. As the paper is drawn through wringer rolls 70 and 76 excess developer is removed. The finished print is slightly damp but quickly dries after being delivered and severed from the roll of photosensitive paper. The electrolytic process, using strongly photoconductive copysheets, is described in U.S. Serial Number 575,070 filed March 30, 1956, now U.S. Patent No. 3,010,883.

Figure 10:
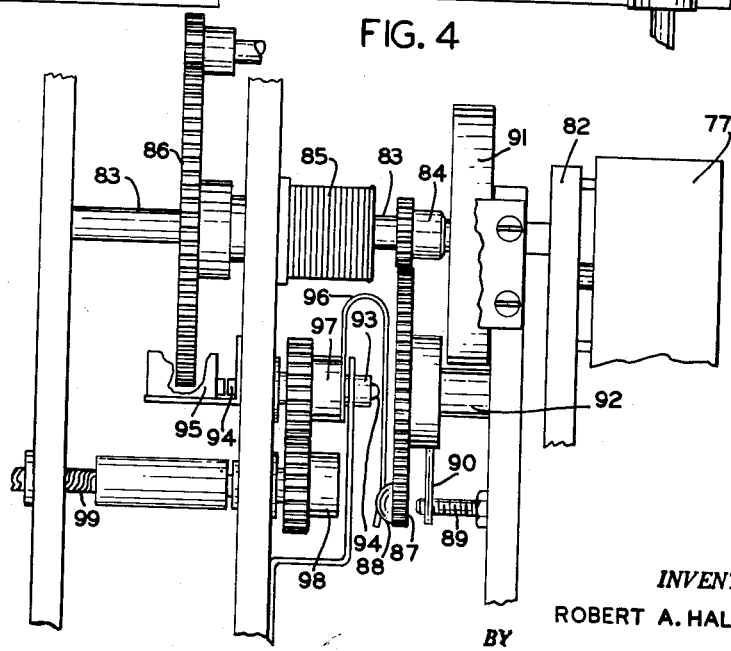
FIGURE 10 is a side view of the film or paper measuring device, partly broken away to show detail and partly in schematic for simplicity.

Since it is particularly advantageous in an enlarger of the sort described herein to minimize waste of the photosensitive paper, a paper measuring device is incorporated into the device, as shown in FIGURE 10. Developer drive motor 77 contains a pop-out rotor connected to a shaft which engages the reduction gears in gear box 82 only when the motor is energized. Power drive shaft 83 and 83' transmits the power output of the reduction gear box 82 to gear 84 and to developer roll drive gear 86 on shaft 83' through single-acting clutch 85. Gear 86 drives both the lower wringer roll 76 and the wetting or developer roll 71, through intermediate gears (shown in FIGURE 8) and, because of single acting clutch 85, is capable of rotation in only one direction. Spring 91 connects to shaft 83 and is so disposed as to oppose the motor driven direction of rotation of shaft 83. Gear 84 transmits power to measuring gear 87 having a stud or boss 88 on the peripheral edge of its outer face. Measuring gear 87 is rotatably mounted at the free end of axle 92, the other end of which is affixed to the frame or a suitable fixed member. Arm 90 is attached to measuring gear 87 and, when no power is supplied to the motor, is maintained, by the tension of spring 91, in contact with stop 89 extending outwardly from the frame. Opposite the outer face of measuring gear 87 and aligned with the axis thereof is hollow shaft 93 on which is rotatably mounted gear 97. To gear 97 is affixed U-shaped spring arm 96, the free end of which is in close parallel relationship to the outer face of measuring gear 87. Sliding pin 94 is positioned in hollow shaft 93 and extends slightly from the open end thereof. The other end of pin 94 is connected to spring switch 95, which it activates when depressed. Spring switch 95 is located in the circuit supplying electrical power to motor 77. Gear 97 and therefore spring arm 96 can be rotated from an external knob or control through a flexible cable 99 and intermediate gear 98.

In operation, this paper feed device is generally used in conjunction with mask 16, since the positioning of mask 16 effectively regulates the uppermost edge of the projected image and hence determines the length of photosensitive paper that will be struck by the projected image. The paper feed device can be integrally connected with the mask to automatically afford the proper length of photosensitive paper for a particular mask setting, or the viewing screen can be suitably calibrated and the paper device can be separately operated and controlled in accordance with the appropriate scale reading appearing on the viewing screen. The external control of flexible cable 99 permits rotation of gear 97 and positioning of the free end of spring arm 96 to any desired points adjacent the outer face of measuring gear 87 at the periphery thereof. After exposure of the photosensitive copypaper the developing sequence is initiated, the motor 77 is activated, and the pop-out rotor engages gear chain 82 and drives gear 86 through clutch 85, thus rotating lower wringer roll 76 and developer roll 71 and feeding the paper through the developing section as described earlier. The rotation of shaft 83 also overcomes the opposition of spring 91, increasing the tension in said spring, and drives measuring gear 87, which rotates until stud 88 contacts the free end of flexible spring 96. This forces spring 96 away from the outer face of gear 87, thereby depressing pin 94 and actuating switch 95 to shut off power to the motor 77. With the motor deenergized, the pop-out rotor disengages from the gear chain 82, permitting the tension in spring 91 to reverse the direction of rotation of measuring gear 87 until arm 90 once again contacts stop 89, the original starting position. During the reverse rotation of measuring gear 87, no power is transmitted to gear 86 because of the slippage of single-acting clutch 85. The paper feed device thus resets itself for another developing cycle.

From the foregoing description it can be seen that the daylight enlarger is an integrated device which is capable of modification and automation to provide excellent quality enlarged prints of photographic transparencies in as little as 10 to 20 seconds and to provide such prints in varying degrees of enlargement. Because of the compact and enclosed arrangement of the various and interrelated components this device can be utilized where limitations of space and inavailability of photographic developing equipment and of darkroom condition would otherwise prevent the customary techniques of print making. Further, because of its ready adaptability to fully automatic operation, this enlarger can be operated by relatively untrained personnel and can even be coin operated for use by the general public.

Although in the embodiment illustrated only the essential parts are shown and described in detail in order to facilitate comprehension of the principles involved, it will be understood that modifications can readily be made without departing from the scope of the invention.

I claim:

1. An enlarger and copying device capable of providing copies in continuous varying degrees of enlargement comprising, in combination, a substantially light-tight housing mounted on a base, a viewing screen at the front end of said housing to view a light image, an adjustable film holder positioned in a projection aperture under said viewing screen, a removable and adjustable light source positioned outside said housing and adjacent said film holder, an adjustable mask for said protection aperture, a track on said base extending longitudinally within said housing opposite said projection aperture, a reflecting sled slidably mounted on said track and having means thereon for reflecting light from said light source onto said viewing screen, a projection lens sled slidably mounted on said track between said reflecting sled and said projection aperture, a plurality of lenses mounted on a rotatable turret on said lens sled, linkage means between said adjustable light source and said turret for automatically adjusting said light and altering the intensity of light emitted therefrom in accordance with the individual requirements of each of said lenses, a synchronized drive and focusing means coupling both said lens sled and said reflecting sled for relative movement thereof on said track to maintain proper focusing of the projected light image at all positions of said slidably mounted lens sled, a folding mirror capable of being extended to deflect light from said light source onto photosensitive copypaper, a blind operating in conjunction with said mirror to expose the photosensitive surface of said copypaper only when said mirror is extended, a developing station for developing a visible image on said photosensitive copypaper, and drive means for feeding said copypaper into and through said developing station.

2. The enlarger and copying device of claim 1 in which said synchronized drive and focusing means comprises (a) a rotatable shaft extending transverse to said track adjacent said lens sled, (b) means for driving said rotatable shaft, (c) a rack attached to said reflecting sled, (d) a gear mounted on said rotatable shaft in engagement with said rack, (e) at least one focusing cam on said rotatable shaft, one for each projection lens, (f) a cam follower located on said lens sled and coupled with said turret to position said cam follower opposite focusing cam for the projection lens in operating position, (g) fine focus means for moving said cam follower parallel to said track relative to said lens sled, (h) biasing means for normally maintaining engagement between said cam follower and focusing cam, and (i) means for disengaging said cam follower from said focusing cam.

3. An enlarger and copying device capable of providing copies in continuous varying degrees of enlargement comprising, in combination, a substantially light-tight housing mounted on a base, a viewing screen at the front end of said housing for viewing a light image, a film holder positioned in a projection aperture in said housing, a light source positioned outside said housing and adjacent said film holder, a track on said base extending longitudinally within said housing opposite said projection aperture, a reflecting sled movably mounted on said track and having means thereon for reflecting light from said light source onto said viewing screen, a projection lens sled movably mounted on said track between said reflecting sled and said projection aperture, at least one projection lens mounted on said lens sled, a synchronized drive means coupling both said lens sled and said reflecting sled for relative movement thereof on said track and for maintaining proper focusing of the light image on said viewing screen at all positions of said movably mounted lens sled, means for exposure and developing photosensitive copypaper, and a folding mirror capable of being extended to deflect the light image from said projection aperture and focus said light image on said photosensitive copypaper.

4. An enlarger and copying device comprising a substantially light-tight housing mounting on a base, a viewing screen at the front end of said housing, an adjustable film holder positioned in a projection aperture in said housing, a light source positioned outside said housing and adjacent said film holder, an adjustable mask for said projection aperture, a track on said base extending longitudinally within said housing opposite said projection aperture, a reflecting sled movably mounted on said track and having means thereon for reflecting light from said light source onto said viewing screen, a projection lens sled movably mounted on said track between said reflecting sled and said projection aperture, at least one projection lens mounted on said lens sled, a synchronized drive means coupling both said lens sled and said reflecting sled for movement thereof on said track and for maintaining proper focusing of the projected light image at all positions of said movably mounted lens sled, a folding mirror capable of being extended to deflect light from said light source onto photosensitive copy paper, a blind operating in conjunction with said folding mirror to expose the photosensitive surface of said copy paper only when said folding mirror is extended, drive means for feeding said exposed copy paper into and through a developing station, means in said developing station for developing a visible image on the light exposed portions of said copy paper, and a variable feed means for limiting development to the light exposed portions only of said copy paper.

References Cited by the Examiner

UNITED STATES PATENTS

| | | | |
|---|---|---|---|
| 2,274,608 | 2/42 | Cooke | 226—188 |
| 2,551,707 | 5/51 | Schnee | 226—188 |
| 2,751,814 | 6/56 | Limberger | 88—24 |
| 2,889,741 | 6/59 | Luz | 88—24 |
| 2,927,503 | 3/60 | Zollinger | 88—24 |
| 2,938,427 | 5/60 | Alves | 88—24 |
| 2,985,066 | 5/61 | Hauptvogel | 88—24 |
| 3,002,434 | 10/61 | Reuter | 95—1.7 |

NORTON ANSHER, *Primary Examiner.*

EMIL G. ANDERSON, WILLIAM MISIEK, *Examiners.*